United States Patent
Dhong et al.

(10) Patent No.: US 6,212,619 B1
(45) Date of Patent: Apr. 3, 2001

(54) SYSTEM AND METHOD FOR HIGH-SPEED REGISTER RENAMING BY COUNTING

(75) Inventors: Sang Hoo Dhong; Harm Peter Hofstee, both of Austin; Kevin John Nowka, Round Rock, all of TX (US); Joel Abraham Silberman, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/075,918

(22) Filed: May 11, 1998

(51) Int. Cl.$^7$ .................................................. G06F 15/00
(52) U.S. Cl. ............................ 712/23; 712/216; 712/218
(58) Field of Search .................... 712/23, 1, 20, 712/216, 210, 218

(56) References Cited

U.S. PATENT DOCUMENTS

| | | | |
|---|---|---|---|
| 4,992,938 | 2/1991 | Cocke et al. | 364/200 |
| 5,197,132 | 3/1993 | Steely, Jr. et al. | 395/375 |
| 5,481,683 | 1/1996 | Karim | 395/375 |
| 5,613,132 | 3/1997 | Clift et al. | 395/393 |
| 5,675,759 | * 10/1997 | Shebanow et al. | 712/217 |
| 5,937,178 | * 8/1999 | Bluhm | 711/212 |
| 5,974,524 | * 10/1999 | Cheong et al. | 712/23 |
| 5,974,525 | * 10/1999 | Lin et al. | 712/23 |

FOREIGN PATENT DOCUMENTS 6-110688 * 4/1994 (JP) .
6-149569 * 5/1994 (JP) .

OTHER PUBLICATIONS

Subbarao Palacharla, Norman P. Jouppi, J.E. Smith, "Complexity–Effective Superscalar Processors," pp. 206–218.

Gurindar S. Sohi, "Instruction Issue Logic for High–Performance, Interruptible, Multiple Functional Unit, Pipelined Computers," 1990 IEEE.

Reports Listed by Year, http://www.cs.wisc.edu/Dienst/UI/2.0/ListYears/1996, Subbarao Palacharla, Norman P. Jouppi, James E. Smith, "Qunatifying the Complexity of Superscalar Processors," pp. 1–47.

* cited by examiner

*Primary Examiner*—Meng-Ai T. An
*Assistant Examiner*—Mackly Monestime
(74) *Attorney, Agent, or Firm*—Casimer K. Salys; Felsman, Bradley, Vaden, Gunter & Dillon, LLP (57) ABSTRACT

A superscalar computer architecture for executing instructions out-of-order, comprising a multiplicity of execution units, a plurality of registers, and a register renaming circuit which generates a list of tags corresponding to specific registers that are not in use during loading of a given instruction. A table is constructed having one bit for each register per instruction in flight. The entries in the table may be combined in a logical OR fashion to create a vector that identifies which registers are in use by instructions that are in flight. Validity bits can also be generated to indicate validity of the generated tags, wherein a generated tag is invalid only if an insufficient number of registers are available during loading of the given instruction. The execution units are preferably pipelined.

18 Claims, 12 Drawing Sheets

SYSTEM AND METHOD FOR HIGH-SPEED REGISTER RENAMING BY COUNTING

BACKGROUND OF THE INVENTION

1. Field of the Invention

The present invention generally relates to computer systems, and more specifically to an improved method of utilizing registers in a processing unit of a computer, particularly wherein the computer has a superscalar architecture.

2. Description of Related Art

The basic structure of a conventional computer system includes one or more processing units connected to various input/output devices for the user interface (such as a display monitor, keyboard and graphical pointing device), a permanent memory device (such as a hard disk, or a floppy diskette) for storing the computer's operating system and user programs, and a temporary memory device (such as random access memory or RAM) that is used by the processor(s) in carrying out program instructions. The evolution of computer processor architectures has transitioned from the now widely-accepted reduced instruction set computing (RISC) configurations, to so-called superscalar computer architectures, wherein multiple and concurrently operable execution units within the processor are integrated through a plurality of registers and control mechanisms.

The objective of superscalar architecture is to employ parallelism to maximize or substantially increase the number of program instructions (or "micro-operations") simultaneously processed by the multiple execution units during each interval of time (processor cycle), while ensuring that the order of instruction execution as defined by the programmer is reflected in the output. For example, the control mechanism must manage dependencies among the data being concurrently processed by the multiple execution units, and the control mechanism must ensure that integrity of sequentiality is maintained in the presence of precise interrupts and restarts. The control mechanism preferably provides instruction deletion capability such as is needed with speculatively executing instruction-defined branching operations, yet retains the overall order of the program execution. It is desirable to satisfy these objectives consistent with the further commercial objectives of minimizing electronic device count and complexity. The prevailing convention in the context of superscalar architectures is to reduce the size and content of the registers and the bit size of the words used for control and data transmission among the circuits. Additional information on superscalar designs is disclosed in U.S. Pat. No. 5,481,683.

Figure 1:
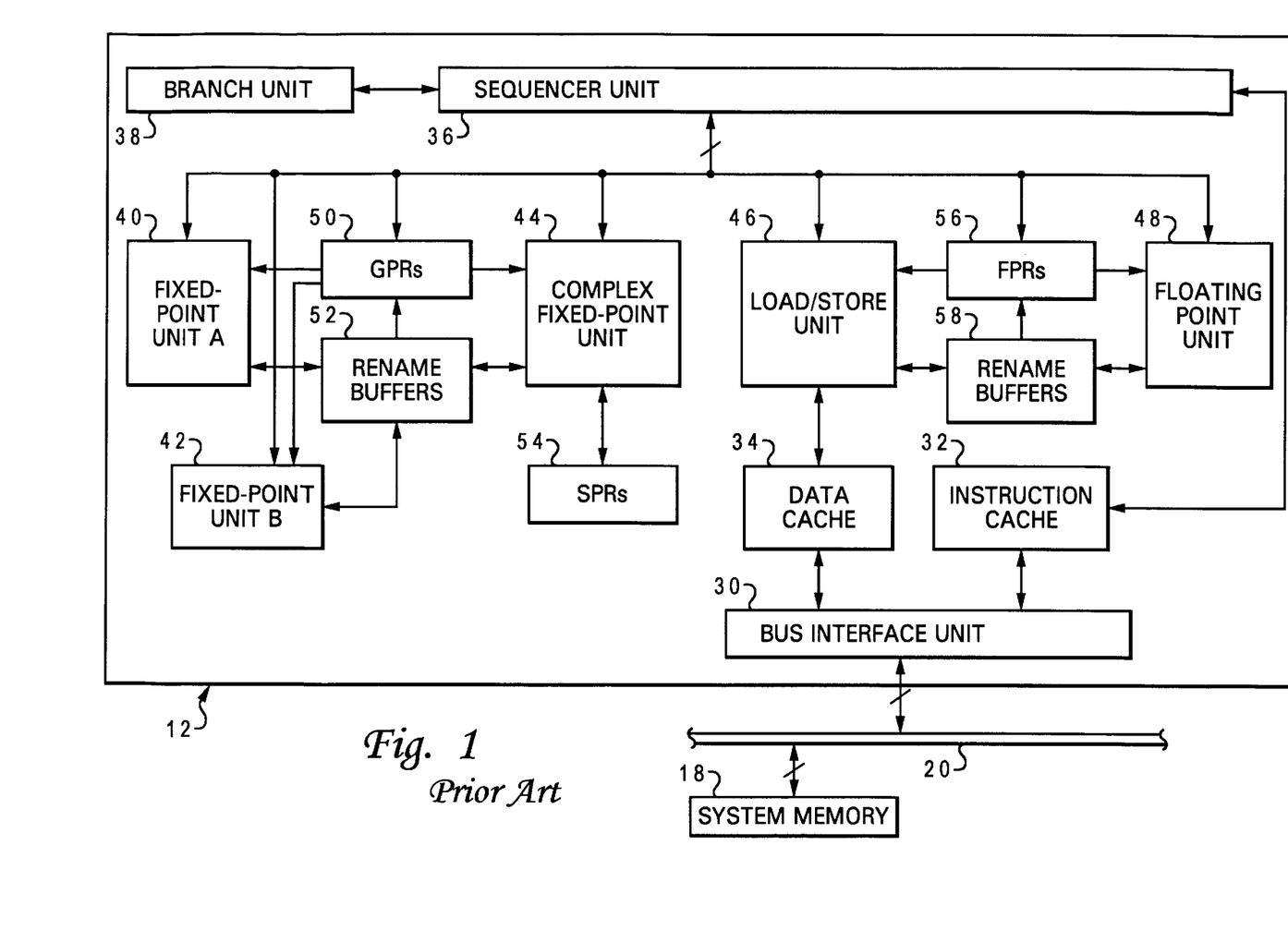
FIG. 1 is a block diagram of a conventional superscalar computer processor, depicting execution units, buffers and registers.

An illustrative embodiment of a conventional processing unit is shown in FIG. 1, which depicts the architecture for a PowerPC™ microprocessor 12 manufactured by International Business Machines Corp. Processor 12 operates according to reduced instruction set computing (RISC) techniques, and is a single integrated circuit superscalar microprocessor. The system bus 20 is connected to a bus interface unit (BIU) 30 of processor 12. Bus 20, as well as various other connections described, include more than one line or wire, e.g., the bus could be a 32-bit bus. BIU 30 is connected an instruction cache 32 and a data cache 34. The output of instruction cache 32 is connected to a sequencer unit 36. In response to the particular instructions received from instruction cache 32, sequencer unit 36 outputs instructions to other execution circuitry of processor 12, including six execution units, namely, a branch unit 38, a fixed-point unit A (FXUA) 40, a fixed-point unit B (FXUB) 42, a complex fixed-point unit (CFXU) 44, a load/store unit (LSU) 46, and a floating-point unit (FPU) 48.

The inputs of FXUA 40, FXUB 42, CFXU 44 and LSU 46 also receive source operand information from general-purpose registers (GPRs) 50 and fixed-point rename buffers 52. The outputs of FXUA 40, FXUB 42, CFXU 44 and LSU 46 send destination operand information for storage at selected entries in fixed-point rename buffers 52. CFXU 44 further has an input and an output connected to special-purpose registers (SPRs) 54 for receiving and sending source operand information and destination operand information, respectively. An input of FPU 48 receives source operand information from floating-point registers (FPRs) 56 and floating-point rename buffers 58. The output of FPU 48 sends destination operand information to selected entries in floating-point rename buffers 58. Processor 12 may include other registers, such as configuration registers, memory management registers, exception handling registers, and miscellaneous registers, which are not shown. Processor 12 carries out program instructions from a user application or the operating system, by routing the instructions and data to the appropriate execution units, buffers and registers, and by sending the resulting output to the system memory device (RAM), or to some output device such as a display console.

Register sets such as those described above limit superscalar processing, simply due to the number of registers that are available to a particular execution unit at the beginning of instruction execution (i.e., the registers must be shared among the different execution units). Moreover, superscalar operations are typically "pipelined," that is, a plurality of processing stages are provided for a given execution unit, with each stage able to operate on one instruction at the same time that a different stage is operating on another instruction, so the registers must be further shared. The problem is exacerbated when a long sequence of instructions requires access to the same register set. Furthermore, programmers often use the same registers as temporary storage registers rather than moving data to and from system memory (since the latter process takes a large amount of time relative to processor speed), so a small register set can cause a "bottleneck" in the performance stream.

Techniques have been devised for expanding the effective number of available registers, such as by providing register renaming. Register renaming provides a larger set of registers by assigning a new physical register every time a register (architected) is written. See "Instruction Issue Logic for High-Performance, Interruptible, Multiple Functional Unit, Pipelined Computers," IEEE Transactions on Computers, vol. 39, no. 3 (March 1990). A physical register is released for re-use when an instruction that overwrites the architected state maintained in that register completes.

The mapping from architected to physical registers can be maintained as a table with one entry per architected register, or as a table with one entry per physical register. The former is often referred to as the "RAM approach" whereas the second is referred to as the "CAM" (content addressable memory) approach. The second scheme requires associative lookup when an architected register tag (address) is to be mapped to a physical register tag. Both the CAM and RAM schemes are presently in use. See "Quantifying the Complexity of Superscalar Processors," S. Palacharla, N. Jouppi, J. Smith, Technical Report CS-TR-96-1328, University of Wisconsin-Madison, November 1996. The remainder of this discussion focuses on the CAM scheme, because it provides the most natural context for the present invention.

Presently available high-performance techniques for register renaming require maintaining a free list of physical register tags which address physical registers that are not in use. The free list is a separate structure, not very well matched to the rest of the register renaming circuitry. Also, renaming multiple instructions in a single cycle requires multiple read and write ports on the free list, which tends to make it both big and slow. For these reasons it would be desirable to devise a method of generating tags of physical registers that are not in use that better supports a high-performance implementation, as in a high-speed microprocessor. It would further be desirable if the mechanism could be combined with a high-performance area-efficient mechanism for checkpointing the state of a microprocessor.

SUMMARY OF THE INVENTION

It is therefore one object of the present invention to provide an improved processing unit for a computer system.

It is another object of the present invention to provide such an improved processing unit which implements register renaming to more efficiently use register sets within the processor.

It is yet another object of the present invention to provide a system and method for register renaming which is particularly suited for high-speed processing, including speeds of 1 GHz or more.

The foregoing objects are achieved in a superscalar computer architecture for executing instructions out-of-order with at least several instructions performing computations on data in computer architected registers (such as general-purpose registers), generally comprising a source of instructions which are arranged in an order that the instructions are to be executed, a multiplicity of execution units for executing the instructions, a plurality of registers for storing data by address, means for loading a given one of the instructions into one of the execution units, and means for generating a list of tags corresponding to specific registers that are not in use during loading of the given instruction. The generating means preferably includes means for constructing a table having one bit for each register per instruction in flight. The entries in the table may be combined in a logical OR fashion to create a vector that identifies which registers are in use by instructions that are in flight. A mechanism may also be provided for generating validity bits to indicate validity of the generated tags, wherein a generated tag is invalid only if an insufficient number of registers are available during loading of the given instruction. The execution units are preferably pipelined. Entries in the map table can be reset after a fault using a checkpointing store.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

The present invention is directed to an improved superscalar computer architecture for executing instructions in an out-of-order sequence, with at least several instructions performing computations on data in computer architected registers of a processing unit. The register renaming method of the present invention provides tags (addresses) for physical registers that are not in use, that is, those registers which are not part of the architected state of the processor for any instructions that are "in flight"(i.e., instructions that have been dispatched and that have not yet been completed), and so are available to be assigned as new targets. A processing unit constructed in accordance with the present invention may include the various components shown in the superscalar architecture of FIG. 1, but those skilled in the art will appreciate that the invention has applicability to other architectures besides the Power™ architecture.

Figure 2:
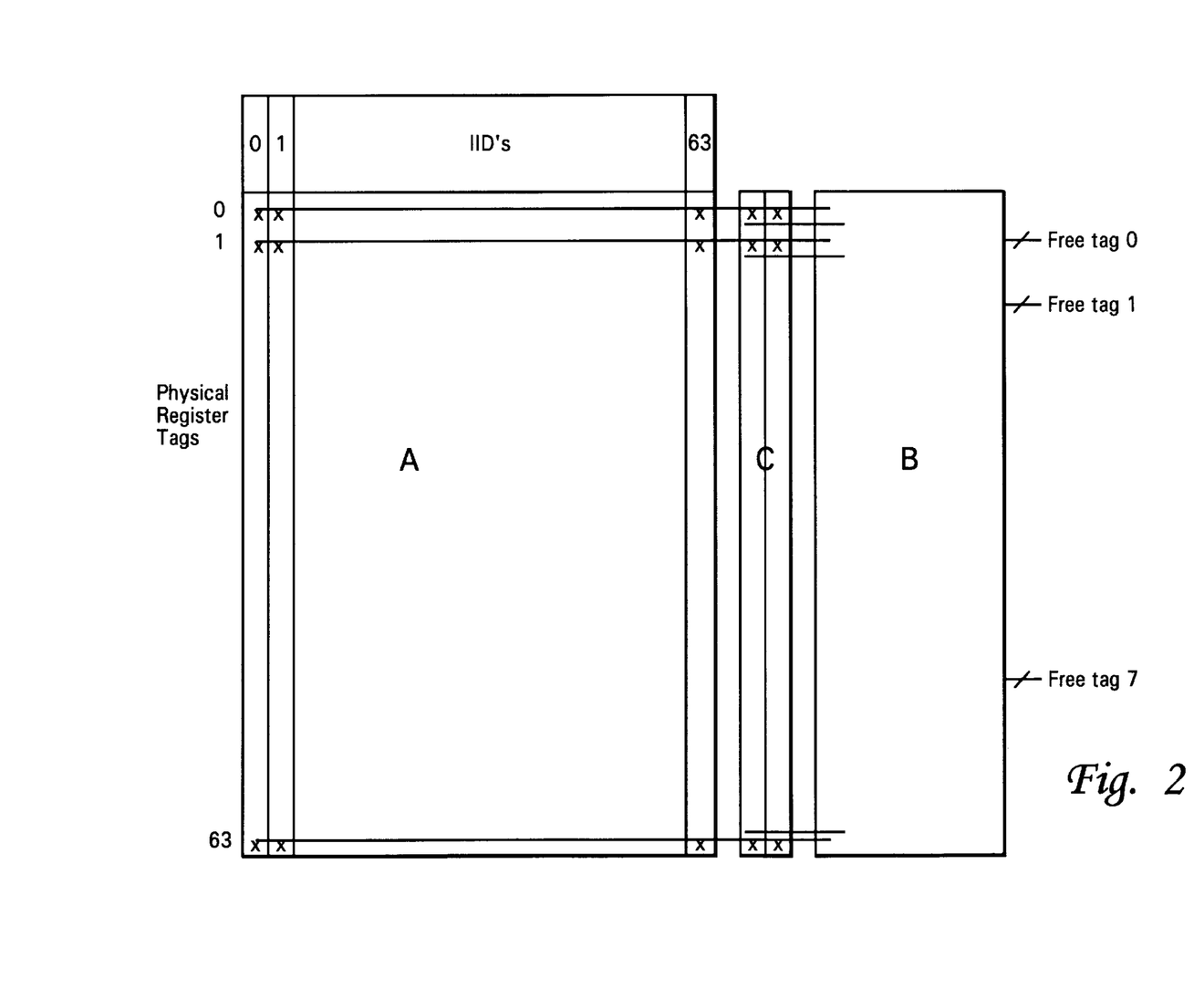
FIG. 2 is a block diagram of one embodiment of a register renaming circuit constructed in accordance with the present invention.

With reference now to the figures, and in particular with reference to FIG. 2, the mechanism used according to one implementation of the present invention requires a table A with one bit for each physical register per instruction in flight. A bit in table A for a given instruction is set to one (high) if the instruction is in flight and the physical register is part of the architected state directly before execution of that instruction (i.e., the register was in use at the beginning of the instruction).

ALL entries in table A for a physical register are combined in a logical OR fashion to create a vector that identifies exactly which physical registers are in use by instructions that are in flight. This vector is passed to a structure B which produces the tags of physical registers that are not in use and that may be assigned as targets to subsequent instructions (eight tags are depicted in the example). Vector structure B also generates bits to indicate validity of the tags generated. Generated tags will be invalid only if an insufficient number of physical registers are available.

In high-speed, pipelined operation of the instruction dispatch, it cannot be assumed that table A is updated with vectors for newly dispatched instructions in the same cycle in which the target register tags for those instructions were generated. To enable latency in the use of generated free (available) register tags, structure B not only generates the individual tags, but also generates a vector with 1's for tags generated in that cycle. The vector is stored in a shift register C. Shift register C accepts a new entry every cycle and loses the oldest entry. The depth of the shift register is equal to the maximum number of cycles before the dispatch mechanism stores vectors in table A using free register tags produced in that cycle. The contents of shift register C are respectively combined in logical OR fashion with the entries of table A to produce the inputs for vector structure B. This arrangement guarantees that free register tags will not be given out multiple times. This mechanism further allows the dispatch mechanism to discard some of the free register tags provided to it by structure B. Unused free tags are recycled automatically after the number of cycles equal to the depth of shift register C.

Figure 3A:
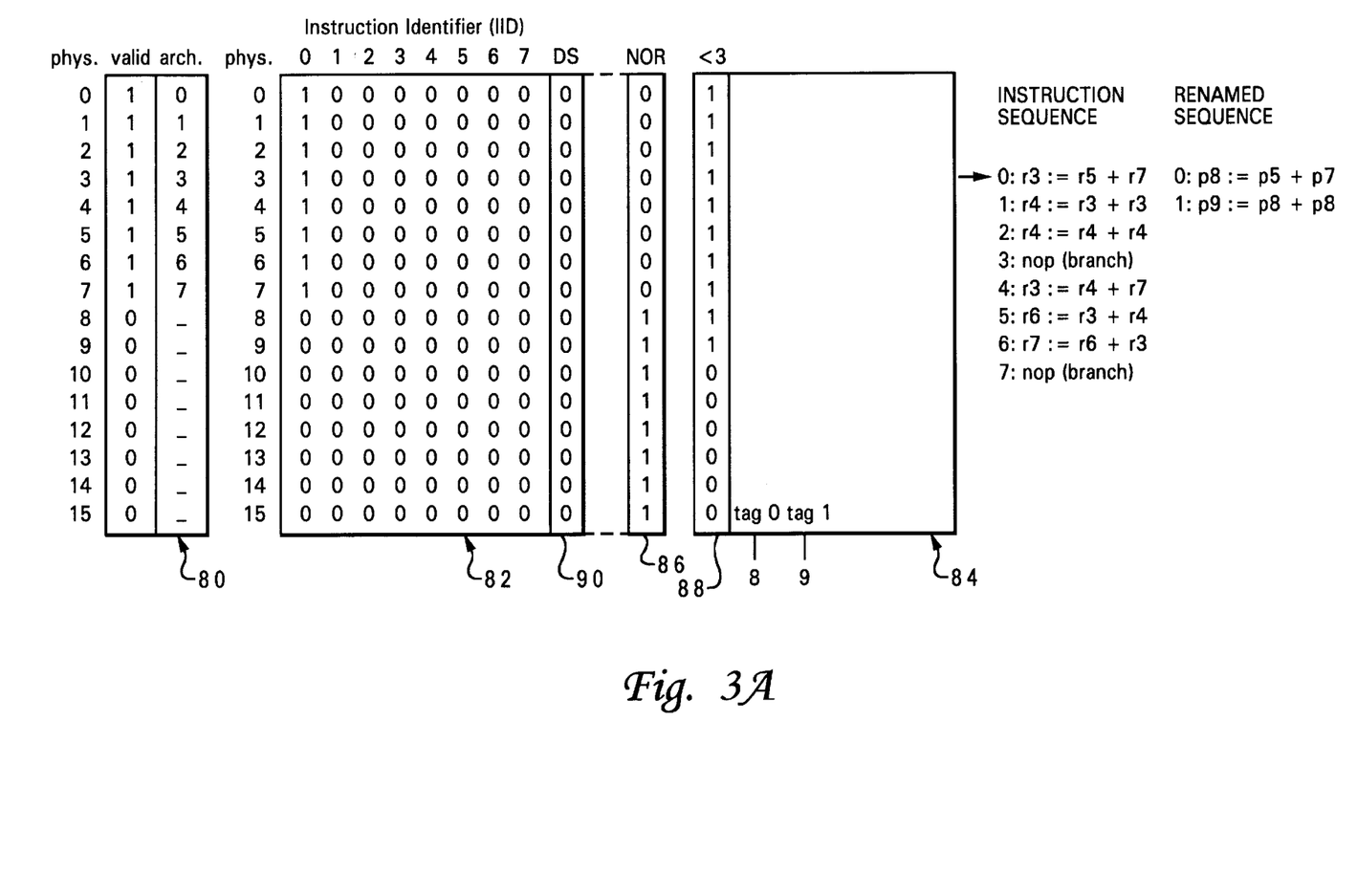
FIGS. 3A–3F are pictorial representations of a map table and checkpointing store which may be used with another embodiment of the present invention.

FIGS. 3A through 3F show how the present invention may be applied to process a sequence of instructions in a hypothetical machine with eight architected registers and 16 physical registers. The initial state of the map table 80, and checkpointing store 82, is shown in FIG. 3A. Architected registers r0 . . . r7 are mapped to physical registers p0 . . . p7. There is only one checkpointed state—column 0 in checkpoint store 82. Physical registers p0 . . . p7 are in use, p8 . . . p15 are not in use, as indicated by the bitwise NOR 86 of all table entries. Given NOR vector 86, table 84 computes that physical registers 8 and 9 are the first two registers available for use as new targets (store 82 of FIGS. 3A–3F generally corresponds to table A of FIG. 2, while structure 84 generally and corresponds to vector structure B and store 90 corresponds generally to shift register C of FIG. 2). The same structure 84 also computes, as indicated in the column 88 labeled "<3", whether NOR column 86, up to and including the corresponding bit, contains less than three 1's. The logical bitwise AND of NOR column 86 and "<3" column 88 has 1's only in positions 8 and 9, corresponding to the two available target tags.

For a superscalar architecture, the processor can process two instructions per cycle. Still referring to FIG. 3A, a hypothetical sequence of instructions (provided by the instruction sequencing (instruction fetch) unit) is indicated. Mapping the first instruction "r3:=r5+r7" results in "p8:= p5+p7". This can be accomplished by an associative lookup in table 80 for sources r5 and r7, and by assigning the first available free physical register tag (p8) to the target. The second instruction "r4:=r3+r3" is mapped to "p9:=p8+p8 ". For multiple instructions mapped simultaneously, it is necessary to find dependencies between sources and targets. In this example, the sources r3 are targets of the first instruction, and hence the correct mapping for r3 is p8, and not p3. One suitable mechanism using a set of comparators and a priority circuit is described in detail in U.S. Pat. No. 4,992,938 (see FIG. 5 of that patent). The target of the second instruction is mapped to the second free physical register tag (p9) provided by structure 84.

Figure 3B:
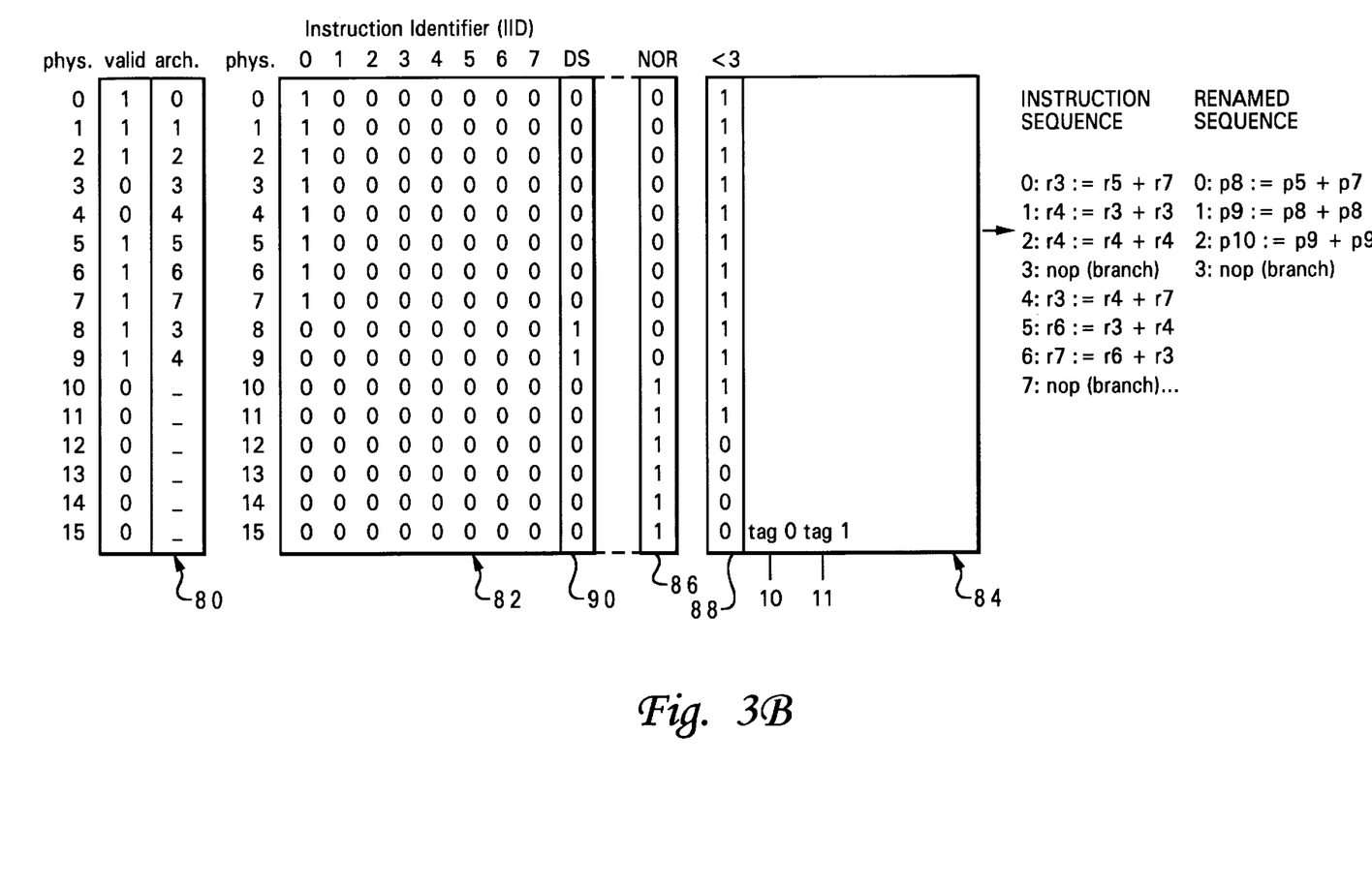

Referring now to FIG. 3B, mapping table 80 has been updated to record the new mappings for registers r3 and r4, (i.e., p8 and p9) and the valid bits for their old mappings (p3 and p4 respectively) have been reset to 0 (invalid). This example assumes there is a one cycle delay before the valid vector corresponding to the intermediate state after the first instruction is renamed, and the valid vector shown in table 80 is written to table 82. To ensure that structure 84 will not give out the same physical registers again, the locally computed AND operation on NOR vector 86 and "<3" column 88 (encoding the free tags provided in the first cycle) is written in DS (delay slot) column 90 which, in the depicted embodiment, is part of array 82. The bitwise NOR now indicates p0 though p9 are in use, and p10 through p15 are available. Structure 84 provides the first two of these latter registers. Instruction 2"r4:=r4+r4" is renamed (mapped) to "p10:=p9+p9". Instruction 3 is a branch instruction, and has no register target, hence the second target tag provided (p11) is not used.

Figure 3C:
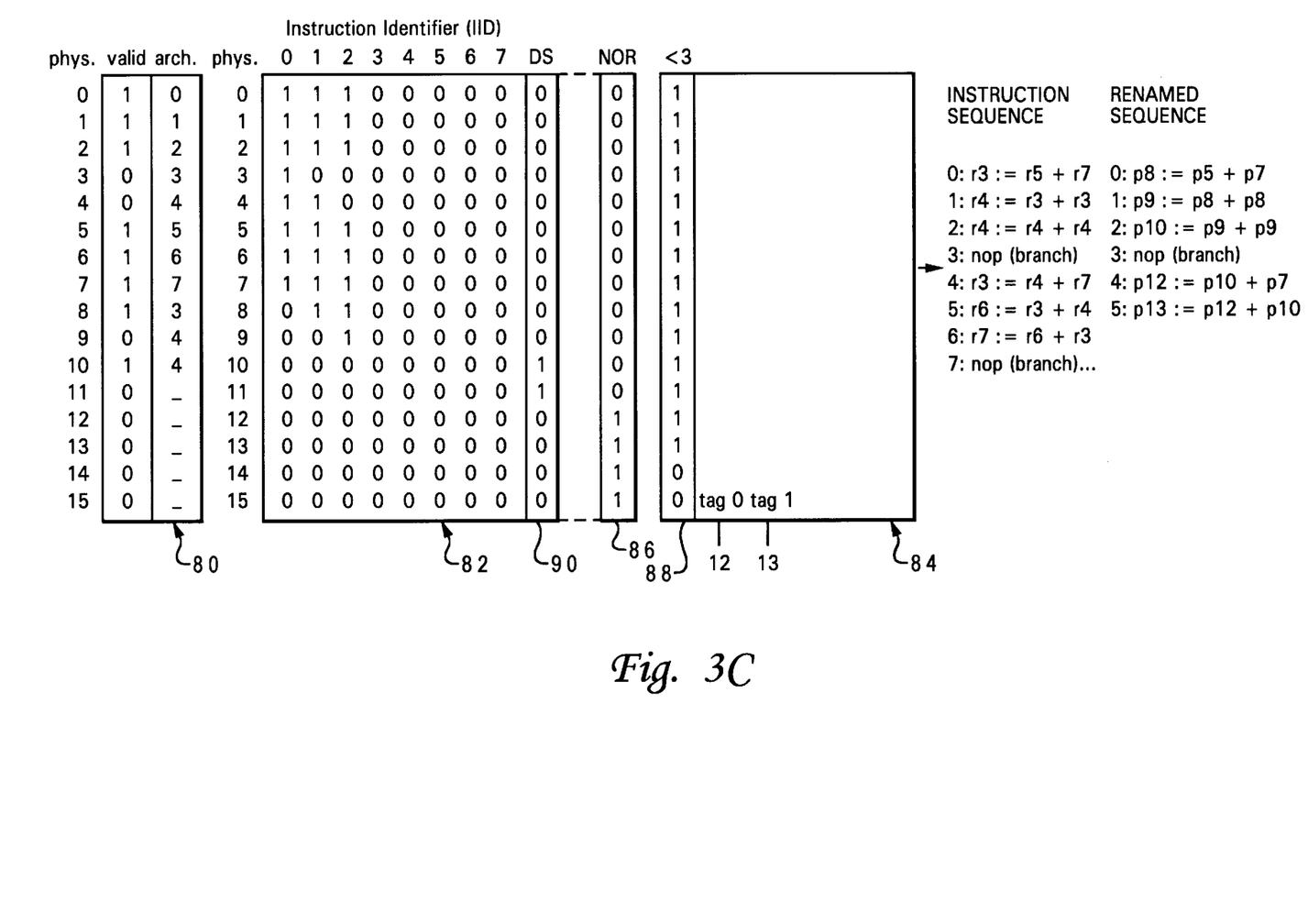

Referring now to FIG. 3C, table 80 has been updated to reflect the new translation for r4, and the first two entries, one cycle delayed, have been written in table 82. DS column 90 has been overwritten and reflects the two targets (p10 and p11) provided in the previous cycle. NOR column 86 reflects that registers p0 through p11 are in use, even though p11 was not assigned. The next two available tags are therefore found to be p12 and p13. Instructions 4 and 5 are renamed as indicated.

Figure 3D:
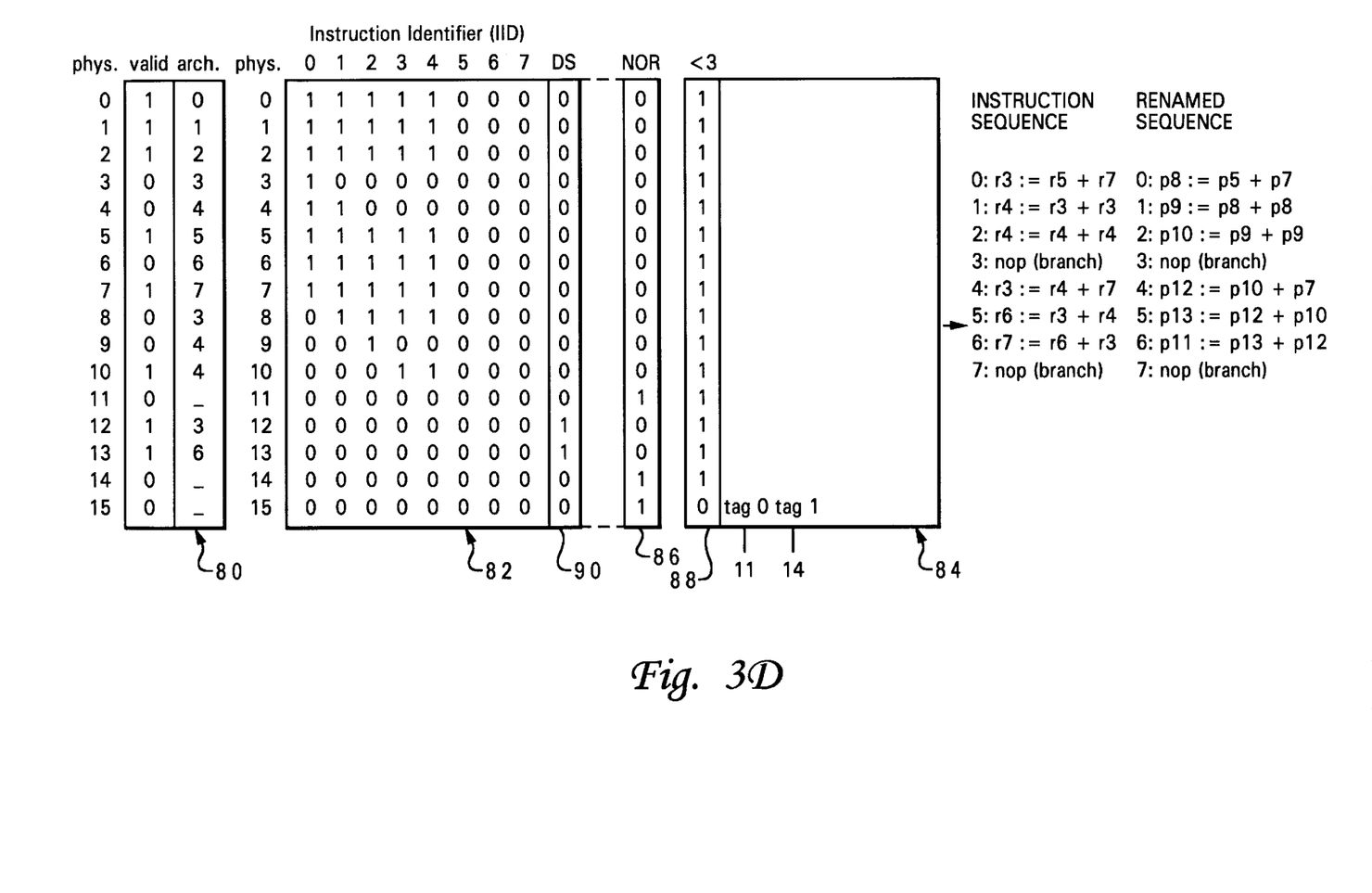

Referring now to FIG. 3D, table 80 has been updated to reflect the new translations for r3 (p12) and r6 (p13). The validity vectors corresponding to the map state prior to translating instructions 3 and 4 have been written (with a delay of one cycle). DS column 90 has been written as the AND of NOR column 86 and "<3" column 88 from FIG. 3C, and reflects the free physical register tags provided in the previous cycle. By inspecting table 82, specifically row 11, we observe that the unassigned register p11 has been reassigned to the pool of available free physical registers, since the NOR of column 11 in table 82 is now "1". The first two available tags are thus 11 and 14. Instructions 6 and 7 are renamed as indicated.

Figure 3E:
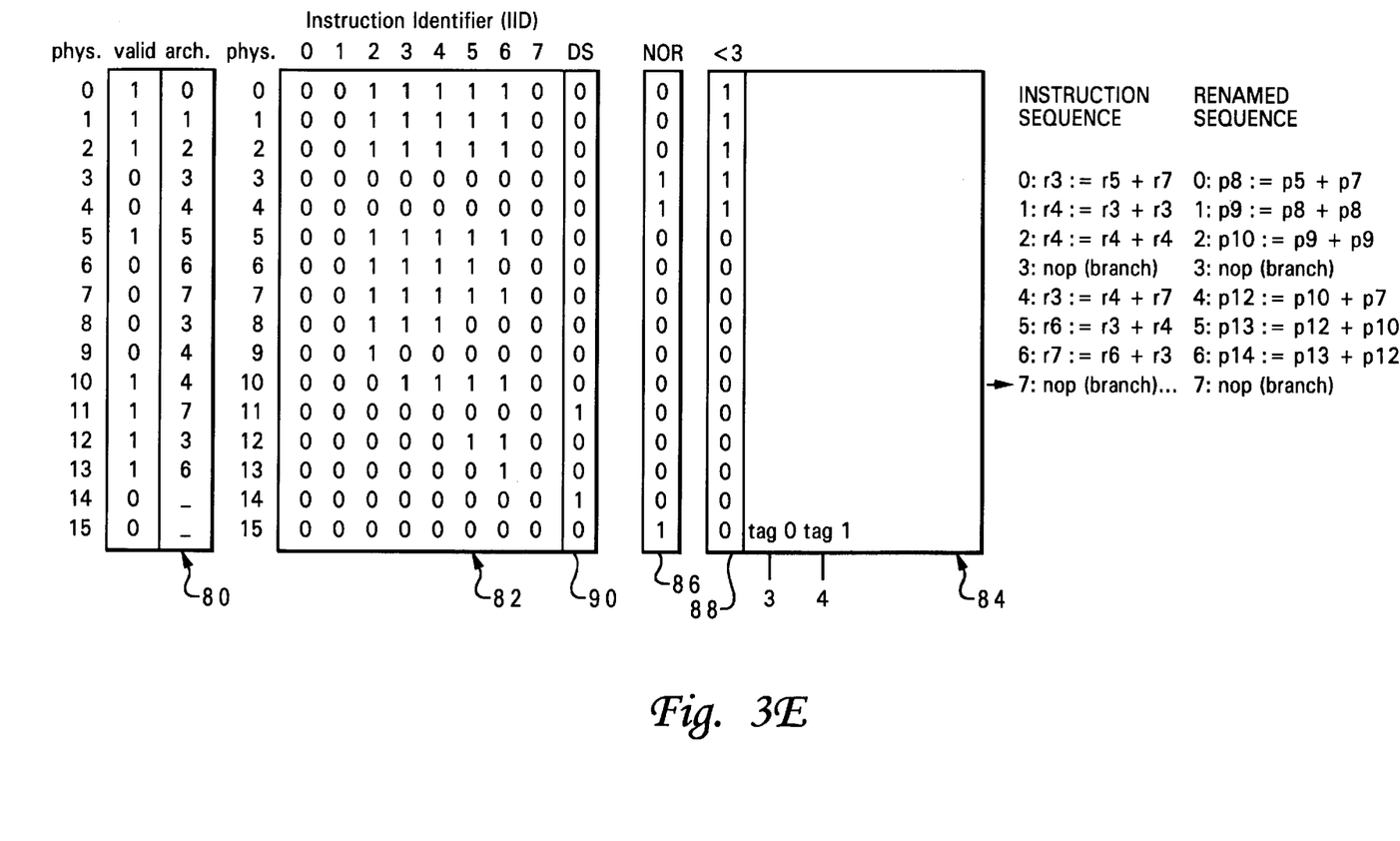

The state of table 82 after instructions 0 and 1 have been committed is shown in FIG. 3E. Columns 0 and 1, which saved the validity bits for instructions 0 and 1, have been cleared, which results in adding p3 and p4 to the pool of free registers. This outcome is correct, because committing instruction 0 results "architecturally" in overwriting register r3, meaning that its previous value, stored in p3, is no longer accessible. Hence register p3, and similarly p4, can now be reused.

Figure 3F:
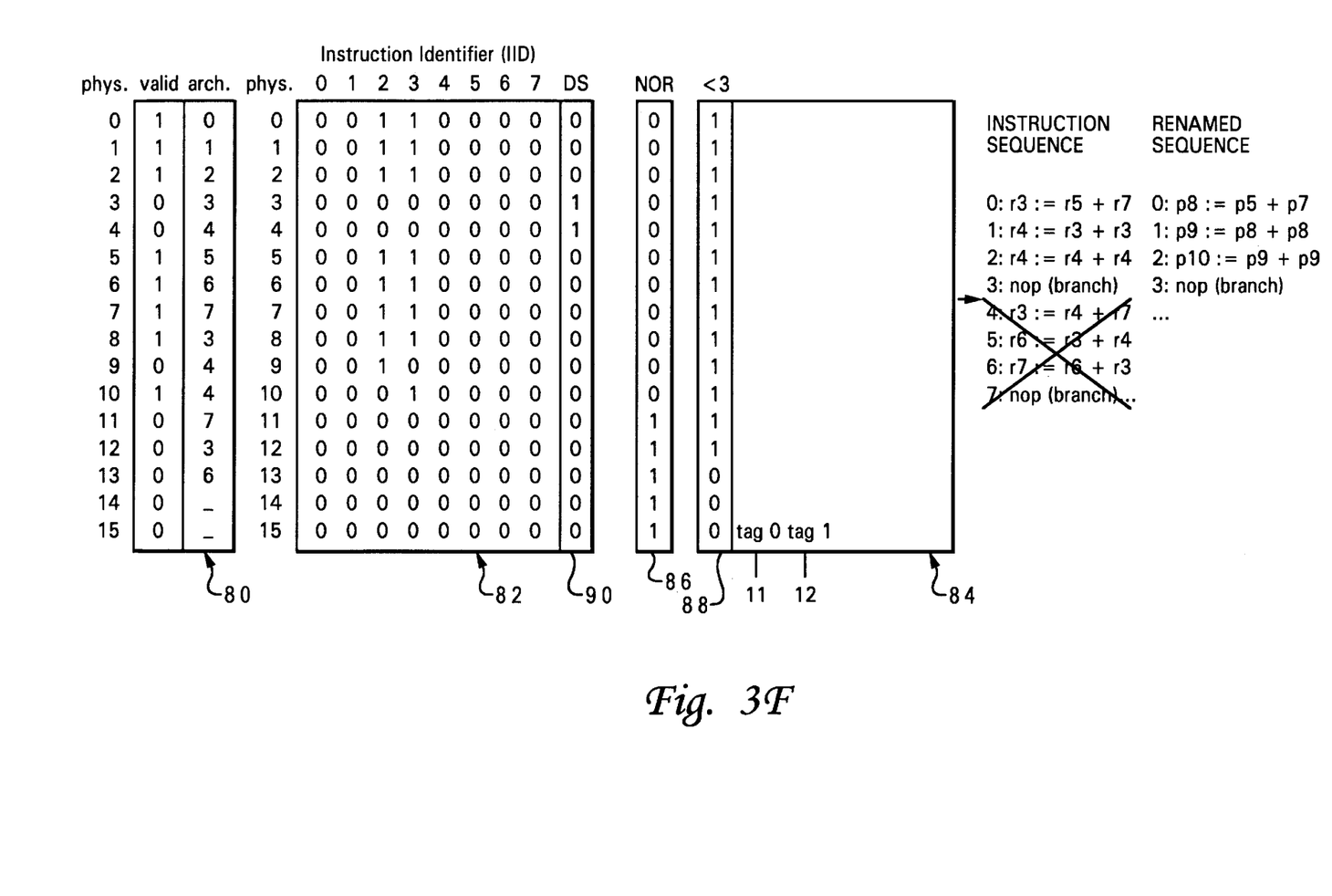

Referring now to FIG. 3F, assuming that instruction 3 has been found to cause a fault (for instance a mispredicted branch), the state of the machine prior to renaming instruction 3 must be restored. Restoration can be achieved by resetting the entries in table 82 corresponding to the instructions that followed instruction number 3, and by copying the valid vector of instruction number 3 into the valid bits of table 80. Care must be taken to also reset the one cycle delayed writes to entries 7 and 8 (zero). It is not necessary to reset DS column 90.

In the foregoing example, stall conditions have been omitted, such as a full table 82, or a lack of available free tags, so as not to make the description overly complicated. Whenever one of these stall conditions occurs, the instruction sequencing unit must be notified that none (or not all) instructions were processed, and the sequencing unit must present these instructions again.

Table 80 may be implemented as a content addressable memory (CAM) with 6 read ports (four for renaming the sources, and two for resetting the valid bits of the target's previous mapping) and two write ports (for writing the newly assigned targets). Structure 82 may be implemented as an array with two write ports (for the two valid vectors) and a separate latch DS. Structure 82 also preferably contains a mechanism for resetting multiple columns at once. One mechanism uses a wraparound bit to ensure the sequence of IID's is always increasing. A single set of comparators then suffices to purge entries with IID's greater than the faulting instruction. Many other implementations are possible.

While FIGS. 2 and 3A–3F depict a table organized as a register file with instruction identifiers (IIDs) associated with all instructions in flight and a fixed location in the table per IID, the mechanism can be provided in an alternative implementation by organizing the table associatively as a content-addressable memory or as a shift register. The information stored in the table can also be used to restore the state of the processor if an instruction causes an exception, or if instructions that were executed speculatively must be canceled (going back up the pipeline).

Referring now to FIGS. 4A–4D and 5A–5B, in an exemplary operation the desired outputs of structure B are (i) the tags of eight free physical registers, (ii) bits indicating the validity of these tags, and (iii) a vector of bits that can be stored in shift register C encoding the same eight free physical registers.

The circuits shown in FIGS. 4A–4D illustrate a generalization of the count-leading-zeroes function, which encodes the location of the first "1" in a bitvector. It computes a binary encoding of the first "1", a binary encoding of the second "1", and so forth up to an encoding of the kth "1"(8 in the example) in bitvector $a_0 \ldots a_{2n-1}$. This construction is recursive. The binary (n bit) encoding of the location of the kth "1"in $a_0 \ldots a_{2n-1}$ is either a "0" followed by the (n-1 bit) binary encoding of the kth "1" in $a_0 \ldots a_{2n-1}$, or, if $a_0 \ldots a_{2n-1}$ contains fewer thatn k $l$, say l a "1" followed by the (n-1 bit) binary encosing of the k-l th "1" in $a_0 \ldots a_{2n-1}$.

Figure 4A:
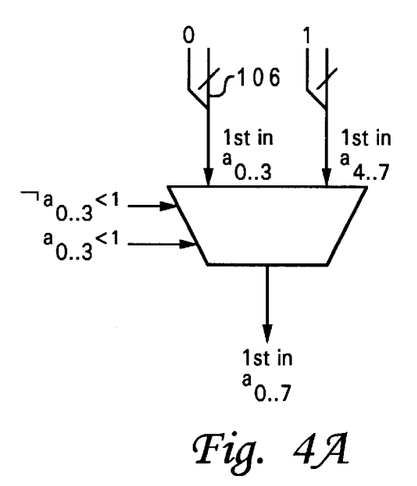
FIGS. 4A–4D show representative circuits constructed in accordance with one embodiment of the present invention that compute a binary encoding of the tags of the first 8 free registers using the conditions computed with the circuitry of FIGS. 5A and 5B.
Figure 4B:
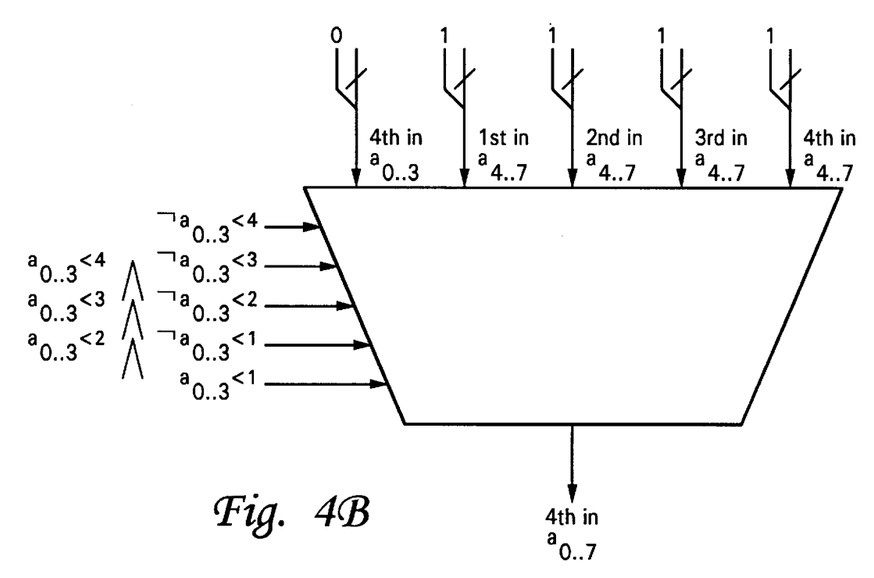
Figure 4C:
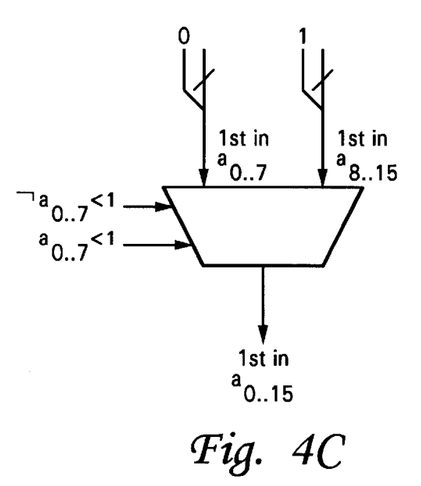

This function is conveniently implemented as a multiplexer with the different conditions (no $l$ in $a_0 \ldots a_{2n-1}$, one "1" in $a_0 \ldots a_{2n-1}, \ldots$ k or more "1"s in $a_0 \ldots a_{2n-1}$) as multiplexer selects, and the n-1 bit tags, extended with a "0" or a "1", as multiplexer inputs. Examples for different values of n and k are shown in FIGS. 4A (n=3, k=1), 4B (n=3, k=4), 4C (n=4, k=1), and 4D (n=4, k=8).

Figure 4D:
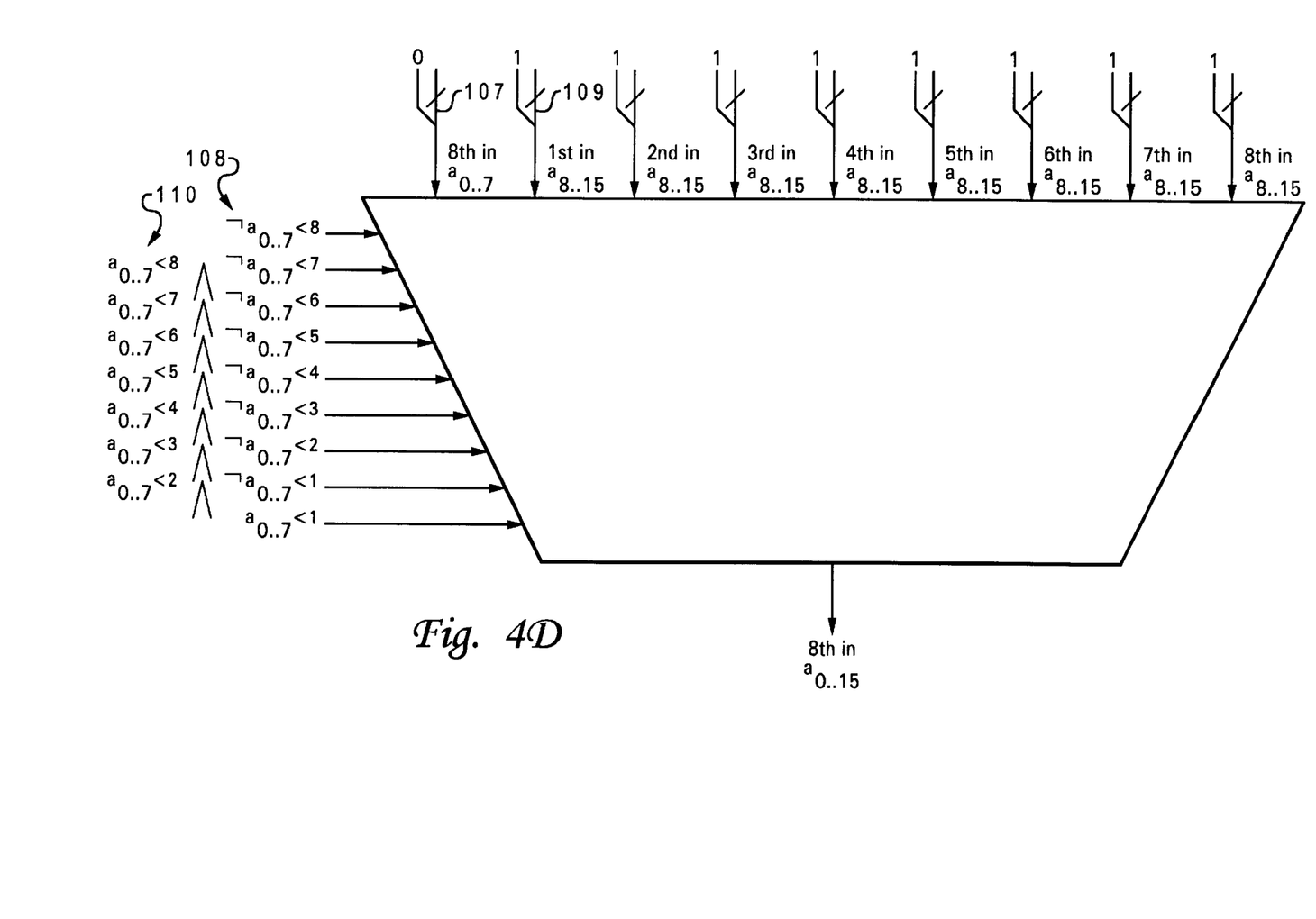

In FIG. 4D, representative of the most complex of these multiplexing stages, computes the 4-bit binary encoding of the 8th "1"(in $a_0 \ldots a_{15}$). This 4-bit encoding is "0" followed by the 3-bit encoding of the location of the eighth "1" in $a_0 \ldots a_7$ (107) if that sequence contains at least 8 $l$ (condition 108). It is the 3-bit encoding of the location of the first "1" in $a_8 \ldots a_{15}$ (109) if $a_0 \ldots a_7$ contained 7 $l$ (condition 110) and so forth.

Even though it is possible to compute the two-bit binary encodings of the locations of the first four $l$ in the four-bit sub-sequences by adding more levels of multiplexers, it is generally advantageous to compute these conditions directly. For example, the first bit of input 106 in FIG. 4A (first "1" in $a_0 \ldots a_3$) may be computed as NOT $(a_0 \ldots a_1)$ and the second bit may be computed as $(a_1$ AND NOT $a_0)$ OR $(a_3$ AND NOT $a_2$ AND NOT $a_1$ AND NOT $a_0)$.

Multiplexer selects have been rewritten to emphasize that it suffices to calculate whether the number of $l$ in any sequence is less than l, for $0 \leq l \leq k$. Hence, $a_0 \ldots 2n_{-1} \geq 1$ (the number of $l$ in $a_0 \ldots 2n_{-1}$ being greater than l) is equivalent to $\neg a_0 \ldots 2n_{-1} < l$, and $a_0 \ldots 2n_{-1} = l$ is equivalent to $a_0 \ldots 2n_{-1} < l+1$ AND $\neg a_0 \ldots 2n_{-1} < l$.

Validity bits for the eight register tags are $a_0 \ldots _{63} \geq 1, a_0 \ldots _{63} \geq 2$ through $a_0 \ldots _{63} \geq 8$. These conditions are equivalent to NOT $(a_0 \ldots _{63} < k)$. It requires computing these conditions up to k=9(8+1).

Figure 5A:
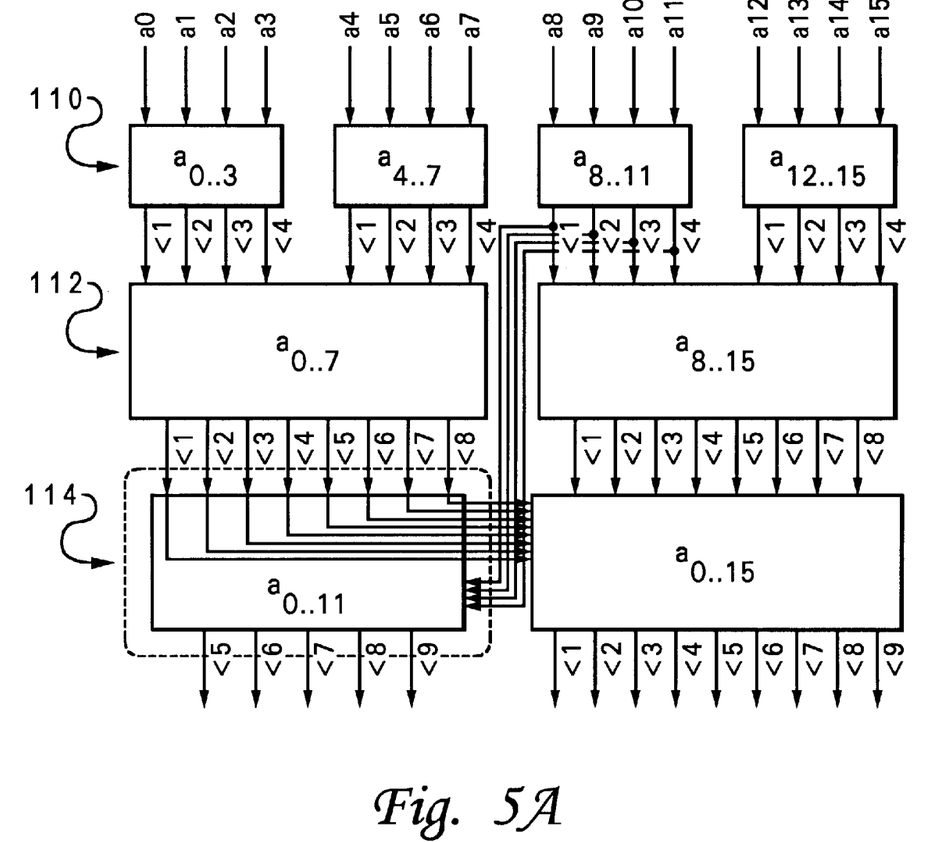
FIGS. 5A and 5B show the interconnections between several levels of logic of the part of structure B of FIG. 2 that computes conditions $$\sum_{i=m}^{n} a_i < k.$$
Figure 5B:
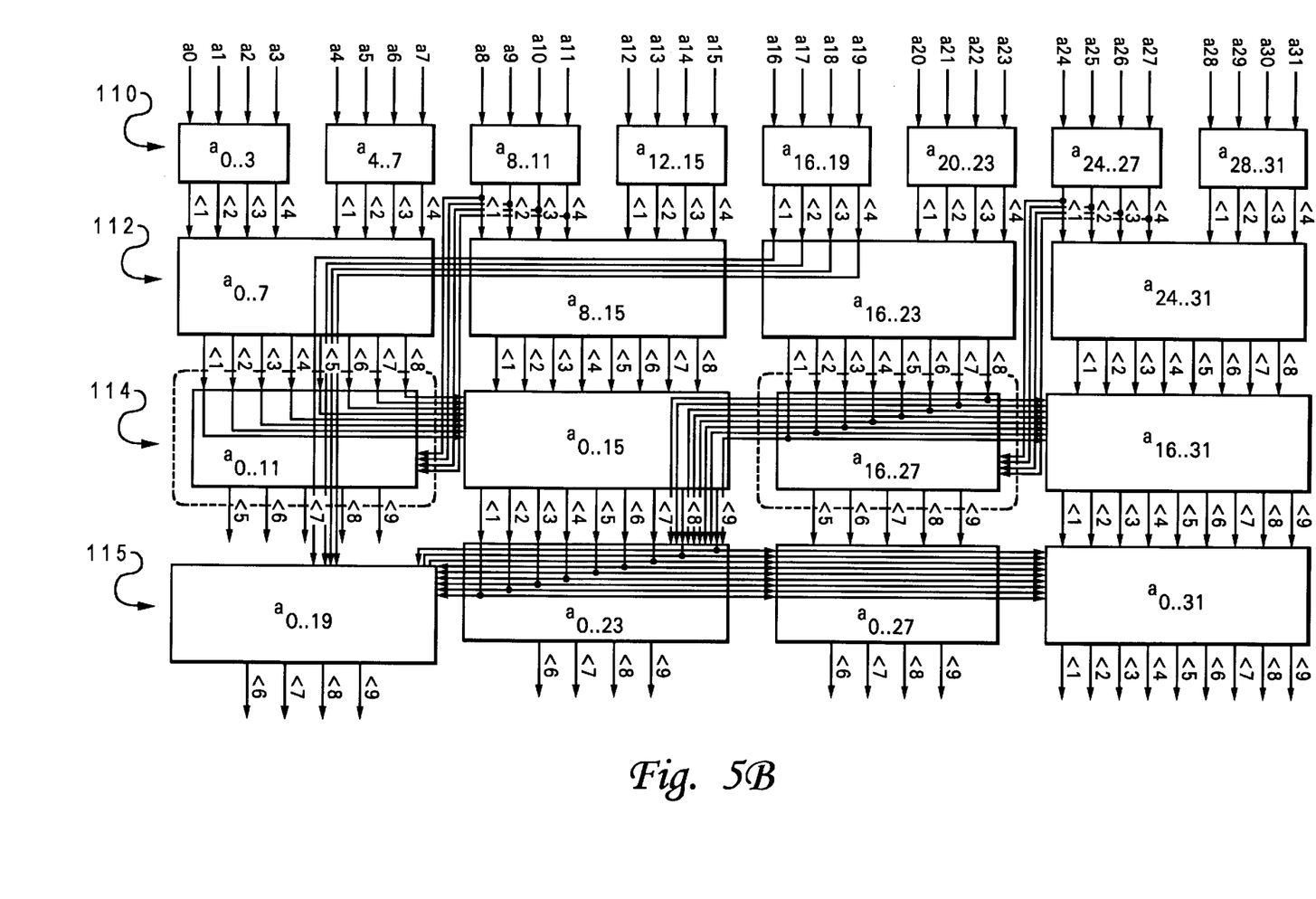

FIGS. 5A and 5B illustrate how relevant conditions.

$$\sum_{i=m}^{n} a_i < k$$

for k between 0 and 9 can be constructed. The first level of logic, 110 in FIG. 4A computes conditions $$\sum_{i=4m}^{4m+3} a_i < k$$

for each group of four bits. This can be done directly, the only non-trivial cases being:

(1)

$$\sum_{i=4m}^{4m+3} a_i < 1$$

which is equivalent to (NOT $a_{4m}$) AND (NOT $a_{4m+1}$) AND (NOT $a_{4m+2}$) AND (NOT $a_{4m+3}$)

(2)

$$\sum_{i=4m}^{4m+3} a_i < 2$$

which is equivalent to ((NOT $a_{4m}$) AND (NOT $a_{4m+1}$) AND (NOT $a_{4m+2}$)) OR (NOT $a_{4m}$) AND (NOT $a_{4m+2}$) AND (NOT $a_{4m+3}$)) OR (NOT $a_{4m+1}$) AND (NOT $a_{4m+2}$) AND (NOT $a_{4m+3}$)), OR (NOT $a_{4m+1}$) AND (NOT $a_{4m+2}$) AND (NOT $a_{4m+3}$) )

(3)

$$\sum_{i=4m}^{4m+3} a_i < 3$$

which is equivalent to ((NOT $a_{4m}$) AND (NOT $a_{4m+1}$)) OR ((NOT $a_{4m}$) AND (NOT $a_{4m+2}$)) OR ((NOT $a_{4m}$) AND (NOT $a_{4m+3}$)) OR ((NOT $a_{4m+1}$) AND (NOT $a_{m+2}$)) OR ((NOT $a_{4m+1}$) AND (NOT $a_{4m+3}$)) OR ((NOT $a_{4m+2}$) AND (NOT $a_{4+3}$)), and (4)

$$\sum_{i=4m}^{4m+3} a_i < 4$$

which is equivalent to (NOT $a_{4m}$) OR (NOT $a_{4m+1}$) OR (NOT $a_{4m+2}$) OR (NOT $a_{4m+3}$).

Subsequent levels of logic compute these conditions for ever larger sub-sequences using logic stages that compute $$\sum_{i=m}^{m+2l-1} a_i < k$$

by computing the equivalent:

$$\left(\left(\sum_{i=m}^{m+l-1} a_1 < k\right) \text{ AND } \left(\sum_{i=m+l}^{m+2l-1} a_1 < 1\right)\right)$$
$$\text{OR} \left(\left(\sum_{i=m}^{m+l-1} a_1 < k-1\right) \text{ AND } \left(\sum_{i=m+l}^{m+2l-1} a_1 < 2\right)\right)$$
$$\vdots$$

-continued $$OR \left( \left( \sum_{i=m}^{m+l-1} a_1 < 1 \right) AND \left( \sum_{i=m+l}^{m+2l-1} a_1 < k \right) \right).$$

Such stages of logic are indicated at 112, 114 and 115 in FIGS. 5A and 5B. Stage 115 computes said conditions for the first 32 bits. A final stage, not indicated in FIG. 4, similarly connected, computes said conditions for all 64 bits.

The vectors must also be prepared to store in structure C. This preparation is easily done by performing a bitwise AND between the vector indicating availability and bitwise computing $a_{0...m} < k+1$ when k targets are required. This operation requires the following final stage of logic:

$a_{0...4m} < 9 = a_{0...4m-1} < 8$ OR $(a_{4m} = 0$ AND $a_{0...4m-1} < 9)$ $a_{0...4m+1} < 9 = a_{0...4m-1} < 7$ OR $(a_{0...4m-1} < 8$ AND $a_{4m} = 0)$ OR $(a_{0...4m-1} < 8$ AND $a_{4m+1} = 0)$

OR $(a_{0...4m-1} < 9$ AND $a_{4m} = 0$ AND $a_{4m+1} = 0)$ $a_{0...4m+2} < 9 = a_{0...4m-1} < 6$

OR $(a_{0...4m-1} < 7$ AND $a_{4m} = 0)$ OR $(a_{0...4m-1} < 7$ AND $a_{4m+1} = 0)$ OR $(a_{0...4m-1} < 7$ AND $a_{4m+2} = 0)$

OR $(a_{0...4m-1} < 8$ AND $a_{4m} = 0$ AND $a_{4m+1} = 0)$ OR $(a_{0...4m-1} < 8$ AND $a_{4m} = 0$ AND $a_{4m+2} = 0)$

OR $(a_{0...4m-1} < 8$ AND $a_{4m+1} = 0$ AND $a_{4m+2} = 0)$ OR $(a_{0...4m-1} 9$ AND $a_{4m} = 0$ AND $a_{4m+1} 0$ AND $a_{4m+2} = 0)$

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of operating a superscalar architecture computer to allow out-of-order execution of input instructions with at least several of the input instructions performing computations on data in computer-architected registers, comprising the steps of:

providing instructions in an order that the instructions are to be executed;

mapping source and target architected registers in the instructions into a set of physical registers; and generating a list of tags corresponding to physical registers that are not in use during said mapping step, said generating step including the step of constructing a table with one bit for each physical register per instruction in flight.

2. The method of claim 1 wherein a given bit in the table for a given instruction is set to a high state if the given instruction is in flight and a physical register corresponding to the given bit is part of the architected state during said mapping step.

3. The method of claim 1 wherein entries in the table are used to restore the processor state in case of an interrupt, or in case speculatively executed instructions need to be canceled.

4. The method of claim 1 wherein entries in the table for a given physical register are combined in a logical OR fashion to create a vector that identifies which physical registers are in use by instructions that are in flight.

5. The method of claim 4 wherein the vector is used to supply a register mapping mechanism with the tags of physical registers that may be assigned as targets, and validity bits for the tags.

6. The method of claim 4 comprising the step of extending the table with extra entries that prevent providing the same physical registers as targets when an update of the table is delayed.

7. A superscalar computer architecture for executing instructions out-of-order with at least several instructions performing computations on data in computer architected registers, comprising:

a source of instructions which are arranged in an order that the instructions are to be executed;

a multiplicity of execution units for executing the instructions;

a plurality of physical registers for storing data;

means for mapping source and target architected registers in the instructions into said physical registers; and means for generating a list of tags corresponding to physical registers that are not in use during mapping of said source and target architected registers, said generating means including means for constructing a table having one bit for each physical register per instruction in flight.

8. The computer architecture of claim 7 wherein said physical registers are general-purpose registers.

9. The computer architecture of claim 7 wherein said execution units are pipelined.

10. The computer architecture of claim 7 wherein a given bit in the table for a given instruction is set to a high state if the given instruction is in flight and a physical register corresponding to the given bit is part of the architected state during mapping of said source and target architected registers.

11. The computer architecure of claim 7 further comprising means for restoring the processor state using entries in said table in case of an interrupt, or in case speculatively executed instructions need to be canceled.

12. The computer architecture of claim 7 further comprising means for combining entries in the table in a logical OR fashion to create a vector that identifies which registers are in use by instructions that are in flight.

13. The computer architecture of claim 12 wherein said mapping means uses said vector to supply tags of said physical registers that may be assigned as targets, and to supply validity bits for said tags.

14. The computer architecture of claim 12 wherein said constructing means extends the table with extra entries that prevent providing the same physical registers as targets when an update of the table is delayed.

15. A data processing system comprising:

memory means for storing data;

a bus communicating with said memory means; and at least one processing unit communicating with said bus, wherein said processing unit has a multiplicity of pipelined execution units for executing instructions contained in said data, a plurality of general-purpose registers for storing data, means for mapping source and target architected registers in the instructions into said general-purpose registers, means for generating a list of tags corresponding to general-purpose registers that are not in use during mapping of said source and target architected registers, including means for constructing a table having one bit for each general-purpose register per instruction in flight, wherein said mapping means uses said vector to supply tags of said general-purpose registers that may be assigned as targets, and to supply validity bits for said tags.

16. The data processing system of claim 15 further comprising means for combining entries in the table in a logical OR fashion to create a vector that identifies which registers are in use by instructions that are in flight.

17. The data processing system of claim 16 wherein said mapping means uses said vector to supply tags of said general-purpose registers that may be assigned as targets, and to supply validity bits for said tags.

18. The data processing system of claim 16 wherein said constructing means extends the table with extra entries that prevent providing the same general-purpose registers as targets when an update of the table is delayed.

* * * * *

UNITED STATES PATENT AND TRADEMARK OFFICE
CERTIFICATE OF CORRECTION

PATENT NO. : 6,212,619 B1
DATED : April 3, 2001
INVENTOR(S) : Dhong et al.

It is certified that error appears in the above-identified patent and that said Letters Patent is hereby corrected as shown below:

Title page,
Please insert after COUNTING, -- USING TABLE HAVING REGISTER BITS FOR EACH INSTRUCTION IN FLIGHT --.

Column 7,
Line 21, please delete "thatn" and insert -- than --, and please delete "l" and insert -- "1"'s --, and please delete "1" and insert -- I --.
Line 22, please delete "encosing" and insert -- encoding --.
Line 24, please delete "l" and insert -- "1"'s --.

Signed and Sealed this

Eleventh Day of December, 2001

Attest:

NICHOLAS P. GODICI
Attesting Officer    Acting Director of the United States Patent and Trademark Office